United States Patent [19]

Bargain

[11] 4,005,154
[45] Jan. 25, 1977

[54] CURING 1,2-EPOXY WITH PREPOLYMER BASED ON POLYAMINES AND OLIGOMERS POSSESSING IMIDE GROUPS

[75] Inventor: Michel Bargain, Lyon, France

[73] Assignee: Rhone-Poulenc S.A., Paris, France

[22] Filed: Jan. 27, 1975

[21] Appl. No.: 544,571

Related U.S. Application Data

[63] Continuation of Ser. No. 264,723, June 21, 1972, Pat. No. 3,883,486.

[30] Foreign Application Priority Data

June 24, 1971  France .............................. 71.23065

[52] U.S. Cl. .................... 260/837 R; 260/30.2; 260/32.6 N; 260/37 N; 260/37 EP; 260/42.28; 260/47 CZ; 260/47 UA; 260/47 EN; 260/63 N; 260/78 TF; 260/78 UA; 260/830 P; 260/857 UN; 260/862
[51] Int. Cl.² .................... C08L 63/10; C08L 63/00
[58] Field of Search .... 260/78 UA, 47 UA, 47 EN, 260/830 P, 837 R

[56] References Cited

UNITED STATES PATENTS

| | | | |
|---|---|---|---|
| 3,562,223 | 2/1971 | Bargain et al. ............... | 260/78 UA |
| 3,637,901 | 1/1972 | Bargain et al. ............... | 260/830 P |
| 3,658,764 | 4/1972 | Bargain et al. ............... | 260/78 UA |
| 3,669,930 | 6/1972 | Asahara et al. ............... | 260/78 UA |
| 3,714,131 | 1/1973 | Hoback et al. ............... | 260/78 UA |
| 3,740,378 | 6/1973 | Crivello ....................... | 260/78 UA |
| 3,839,493 | 10/1974 | Balme et al. ................. | 260/830 P |
| 3,875,113 | 4/1975 | Lefebvre et al. .............. | 260/47 EN |

*Primary Examiner*—Harold D. Anderson
*Attorney, Agent, or Firm*—Stevens, Davis, Miller & Mosher

[57] ABSTRACT

A heat resistant heat-curable polymer composition obtained by reacting, between 50° C. and 350° C., (a) an oligomer having the average general formula:

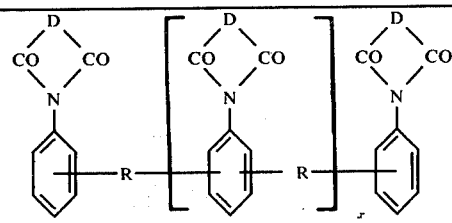

in which $x$ represents a number from 0.1 to about 2, R represents a divalent hydrocarbon radical with 1 to 8 carbon atoms, which is derived from an aldehyde or a ketone of the general formula:

O=R in which the oxygen atom is bonded to a carbon atom of the radical R, and D represents a divalent organic radical possessing 2 to 24 carbon atoms, the free valencies of which are on adjacent carbon atoms and which is derived from an internal anhydride of the general formula:

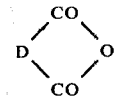

at least 60% of the D radicals in the oligomer containing a polymerizable carbon-carbon double-bond, with (b) a polyamine of the general formula:

$Q(NH_2)_y$ in which $y$ represents an integer at least equal to 2 and Q represents an organic radical of valency y, the relative amounts being such that the oligomer supplies 1.1 to 50 D radicals containing a polymerizable carbon-carbon double bond per —NH₂ group supplied by the polyamine is provided. The properties of the composition can be improved by incorporating therein, during the preparation, an aromatic compound possessing 2 to 4 benzene rings, which does not sublime at atmospheric pressure up to 250° C, and which has a boiling point above 250° C. and/or an aromatic tri- or tetra-carboxylic acid anhydride and/or an unsaturated polyester and/or a monomer containing at least one polymerizable $CH_2 = C\overset{\displaystyle <}{\phantom{x}}$ group. Prepolymers of the oligomer and polyamine can also be used for curing epoxy resins.

24 Claims, No Drawings

CURING 1,2-EPOXY WITH PREPOLYMER BASED ON POLYAMINES AND OLIGOMERS POSSESSING IMIDE GROUPS

This application is a continuation of my USSN 264,723 filed June 21st 1972, now U.S. Pat. No. 3,883,486.

The present invention relates to heat-resistant polymers based on three-dimensional polyimides.

Heat-curable polymers, obtained by reacting a N,N'-bis-imide of an unsaturated dicarboxylic acid with a diprimary diamine, are described in French Pat. No. 1,555,564; the reagents are used in approximately molar proportions or with an excess of bis-imide. Also heat-resistant resins, obtained from a bis-maleimide, from a polyamine with at least two primary amino groups and from an amine which can be a polyamine with at least two amino groups of which at least one is secondary, a primary monoamine or a secondary monoamine, are known (see, for example, French Pat. No. 2,022,609).

The present invention provides a heat-resistant heat-curable polymer composition based on three-dimensional polyimides, obtained by reacting, between 50° C. and 350° C., (a) an oligomer possessing imide groups having the average general formula:

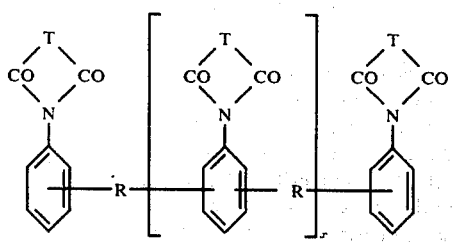

(I)

in which $x$ represents a number ranging from 0.1 to about 2, R represents a divalent hydrocarbon radical with 1 to 8 carbon atoms, which is derived from an aldehyde or a ketone of the general formula:

$$O = R \qquad (II)$$

in which the oxygen atom is bonded to a carbon atom of the radical R, and T represents a divalent organic radical possessing from 2 to 24 carbon atoms, the valencies of which are on adjacent carbon atoms and which is derived from an internal anhydride of the general formula:

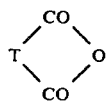

(III)

at least 60% of the T radicals in the oligomer containing a polymerisable carbon-carbon double bond, with (b) a polyamine of the general formula:

$$Q(NH_2)_y \qquad (IV)$$

in which $y$ represents an integer at least equal to 2 and Q represents an organic radical of valency $y$, the proportions of the reagents being such that the oligomer possessing imide groups supplies from 1.1 to 50 T radicals containing a polymerisable carbon-carbon double bond per —NH$_2$ group supplied by the polyamine.

The polyamine of formula (IV) can be a diprimary diamine of the general formula:

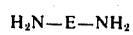

(V)

in which E represents a divalent organic radical possessing from 2 to 30 carbon atoms, for example a linear or branched alkylene radical with less than 13 carbon atoms, a phenylene radical, a cyclohexylene radical or one of the radicals of the formulae:

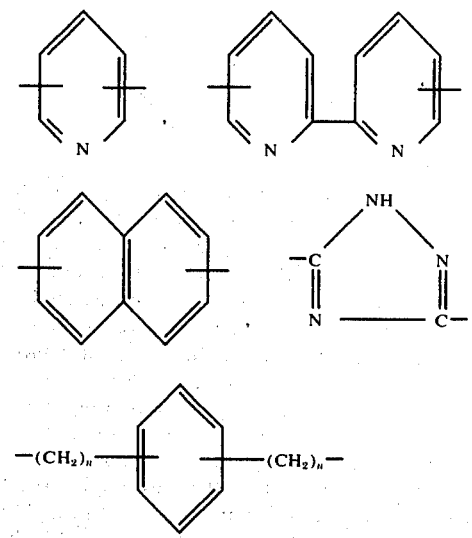

wherein $n$ represents an integer from 1 to 3, or a plurality of phenylene or cyclohexylene radicals connected to one another by a simple valency bond or by an inert atom or group such as —O— or —S—, an alkylene group with 1 to 3 carbon atoms, —CO—, —SO$_2$—, —CONH—, —COO—, —P(O)R$_1$—, —CONH—X—NHCO—,

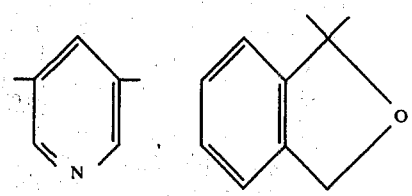

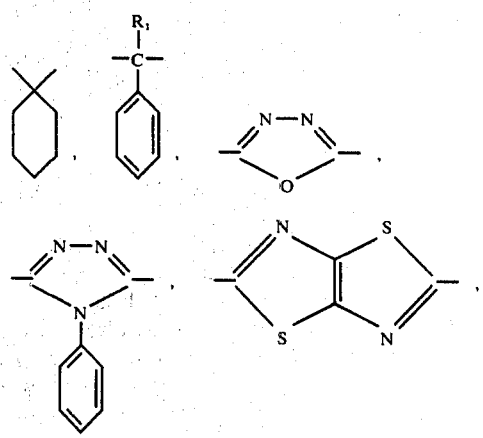

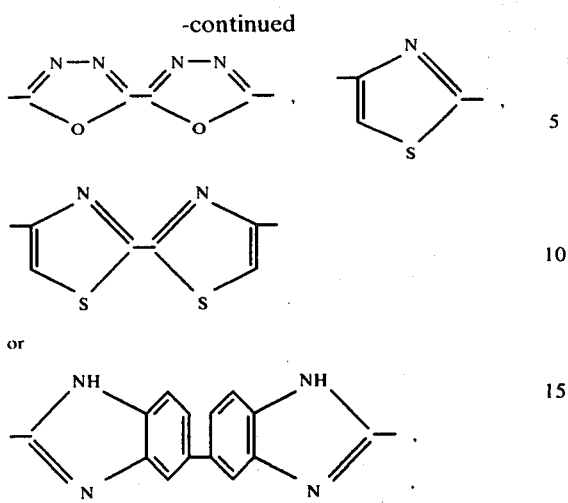

wherein $R_1$ represents a hydrogen atom, an alkyl radical with 1 to 4 carbon atoms, a phenyl radical or a cyclohexyl radical, and X represents an alkylene radical with less than 13 carbon atoms. The various phenylene or cyclohexylene radicals can be substituted by, for example, methyl groups. Examples of diprimary diamines which can be used include 4,4'-diamino-dicyclohexylmethane, 1,4-diamino-cyclohexane, 2,6-diamino-pyridine, metaphenylene-diamine, para-phenylene-diamine, 4,4'-diaminodiphenylmethane, 2,2-bis-(4-amino-phenyl)-propane, benzidine, 4,4'-diamino-phenyl ether, 4,4'-diamino-phenyl sulphide, 4,4'-diamino-diphenylsulphone, bis-(4-aminophenyl)-methyl-phosphine oxide, bis-(4-amino-phenyl)-phenylphosphine oxide, N,N-bis-(4-amino-phenyl)-methylamine, 1,5-diamino-naphthalene, meta-xylylene-diamine, para-xylylene-diamine, 1,1-bis-(para-aminophenyl)-phthalane, hexamethylene-diamine, 6,6'-diamino-2,2'-dipyridyl, 4,4'-diamino-benzophenone, 4,4'-diamino-azobenzene, bis-(4-amino-phenyl)-phenylmethane, 1,1-bis-(4-amino-phenyl)-cyclohexane, 1,1-bis-(4-amino-3-methylphenyl)-cyclohexane, 2,5-bis-(m-aminophenyl)-1,3,4-oxadiazole, 2,5-bis-(p-aminophenyl)-1,3,4-oxadiazole, 2,5-bis-(m-aminophenyl)-thiazolo(4,5-d)-thiazole, 5,5'-di-(m-aminophenyl)-2,2'-bis-(1,3,4-oxadiazolyl), 4,4'-bis-(p-aminophenyl)-2,2'-dithiazole, m-bis-[(4-p-aminophenyl)-2-thiazolyl]-benzene, 2,2'-bis-(m-aminophenyl)-5,5'-dibenzimidazole, 4,4'-diamino-benzanilide, phenyl 4,4'-diamino-benzoate, N,N'-bis-(4-amino-benzoyl)-p-phenylenediamine, 3,5-bis-(m-aminophenyl)-4-phenyl-1,2,4-triazole, N,N'-bis-(p-amino-benzoyl)-4,4'-diamino-diphenylmethane, bis-p-(4-amino-phenoxycarbonyl)-benzene, bis-p-(4-aminophenoxy)-benzene, 3,5-diamino-1,2,4-triazole, 1,1-bis-(4-amino-phenyl)-1-phenyl-ethane and 3,5-bis-(4-amino-phenyl)-pyridine.

Amongst the polyamines of formula (IV) other than the diprimary diamines, those which have less than 50 carbon atoms and which possess from 3 to 5 —NH$_2$ groups per molecule are preferred. The —NH$_2$ groups can be carried by, for example, a benzene ring, optionally substituted by methyl groups, a naphthalene ring, a pyridine ring or a triazine ring; they can also be carried by several benzene rings linked to one another by a simple valency bond or by an inert atom or group which can be one of those described above within the scope of the definition of the symbol

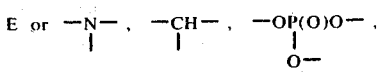

or —P(O)—. Examples of such polyamines include 1,2,4-triamino-benzene, 1,3,5-triamino-benzene, 2,4,6-triamino-toluene, 2,4,6-triamino-1,3,5-trimethyl-benzene, 1,3,7-triamino-naphthalene, 2,4,4'-triamino-diphenyl, 2,4,6-triamino-pyridine, 2,4,4'-triamino-phenyl ether, 2,4,4'-triamino-diphenylmethane, 2,4,4'-triamino-diphenylsulphone, 2,4,4'-triamino-benzophenone, 2,4,4'-triamino-3-methyldiphenylmethane, N,N,N-tri-(4-amino-phenyl)-amine, tri-(4-aminophenyl)-methane, phenyl 4,4',4''-triamino-orthophosphate, tri-(4-amino-phenyl)-phosphine oxide, 3,5,4'-triamino-benzanilide, melamine, 3,5,3',5'-tetraaminobenzophenone, 1,2,4,5-tetraamino-benzene, 2,3,6,7-tetraamino-naphthalene, 3,3'-diamino-benzidine, 3,3',4,4'-tetraamino-diphenylmethane, 3,3',4,4'-tetraaminodiphenylsulphone, 3,5-bis-(3,4-diaminophenyl)-pyridine and oligomers of the type

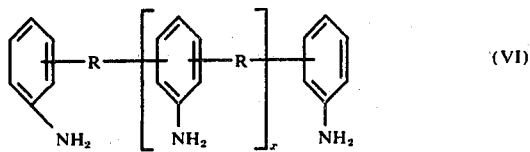

in which R and x are as defined above, which are formed during the condensation of aniline with an aldehyde or a ketone of formula (II); examples of aldehydes and ketones of formula (II) include formaldehyde, acetaldehyde, oenanthaldehyde, benzaldehyde, acetone, methyl ethyl ketone, 2-hexanone, cyclohexanone and acetophenone. The polyamines of formula (VI) can be obtained according to known processes such as those which are described in French Pat. Nos. 1,430,977, 1,481,935 and 1,533,696. The crude mixtures of polyamines obtained according to these processes can be enriched in one or more of their constituents, for example by distillation under reduced pressure. It is to be understood that the term "polyamine", as used herein, is intended to denote mixtures of polyamines with the same number, as well as mixtures of polyamines of which at least two possess different numbers, of functional groups. A diprimary diamine is generally used, optionally combined with an amine with a greater number of functional groups in an amount, by weight, up to 90% of the weight of the diamine employed.

The anhydride of formula (III) can be an anhydride of the general formula:

in which $D_1$ represents an alkylene, cycloalkylene or carbocyclic or heterocyclic monocyclic aromatic radical; such anhydrides include the anhydride of succinic, methylsuccinic, dodecylsuccinic, octadecylsuccinic, benzylsuccinic, 1,2-hexahydrophthalic, cyclopentane-1,2-dicarboxylic, cyclododecane-1,2-dicarboxylic, orthophthalic and naphthalene-1,2-dicarboxylic acid. The anhydride of formula (III) can also be an anhydride of the general formula:

(VIII)

in which $D_2$ represents a linear or monocyclic or bicyclic ethylenic radical; examples of such anhydrides include maleic anhydride, citraconic anhydride, itaconic anhydride, pyrocinchonic anhydride and dichloromaleic anhydride as well as the products of a Diels-Alder reaction between one of these anhydrides and an acyclic, alicyclic or heterocyclic diene. As regards the anhydrides which are derived by a diene synthesis, reference can be made to, for example, volume IV of "Organic Reactions" (John Wiley and Sons, Inc.); tetrahydrophthalic anhydride and endomethylene-tetrahydrophthalic anhydride may be mentioned in particular.

The oligomers, which are described and claimed in U.S. application Ser. No. 264,723 filed June 21st, 1972, now U.S. Pat. No. 3,883,486, possessing imide groups of formula (I) can be prepared from an oligomeric polyamine of formula (VI) and an anhydride of formula (III) of which at least 60 mol % contain a linear or cyclic radical possessing an ethylenic double bond.

By the expression "an anhydride of formula (III)", is meant one or more anhydrides of formula (VIII) or several anhydrides of which at least 60 mol % consist of one or more anhydrides of formula (VIII), the remainder consisting of one or more anhydrides of formula (VII). When several anhydrides are used, they can be employed successively or partially or completely as mixtures.

In order to prepare the oligomers, in a first stage, the corresponding polyamic acids of formula:

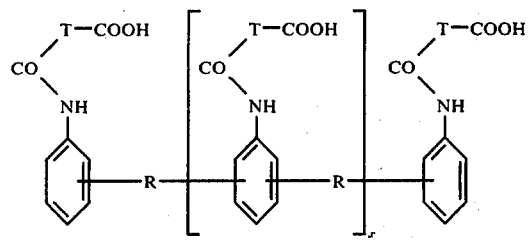

(IX)

in which the various symbols are as defined above, can be prepared by applying known methods for the preparation of maleamic acids; on this subject, reference can, for example, be made to "Maleic Anhydride Derivatives" by FLETT and GARDNER. An advantageous process consists of bringing the polyamine of formula (VI) and the anhydride of formula (III) into contact in an organic liquid which is a solvent for the reagents. Amongst the solvents which can be used, there may be mentioned solvents with a high degree of polarity such as dimethylformamide, dimethylacetamide, dimethylsulphoxide, N-methylpyrrolidone and N-methylcaprolactam; it is also possible to use cyclic ethers such as tetrahydrofurane and dioxane; it is particularly advantageous to use dialkyl ketones such as acetone and diethyl ketone. The polyamic acids can thereafter be isolated by filtration. In a second stage, the polyamic acids can be subjected to a cyclising dehydration by applying known methods for the preparation of bis-maleimides from the corresponding bis-maleamic acids, such as described in, for example, U.S. Pat. Nos. 3,018,290, 3,018,292 and 3,127,414. Preferably the dehydration of the polyamic acids is carried out by means of a lower carboxylic acid anhydride, in the presence of a tertiary amine, an organic diluent and a catalyst consisting of a nickel derivative which is soluble in the liquid phase of the reaction mixture; this process can be carried out by applying the method described in French Pat. No. 2,055,969 for the preparation of mono-imides and bis-imides; a particular method which is advantageous consists of using directly polyamic acids obtained from the polyamine of formula (VI) and the anhydride of formula (III) in suspension in one of the organic solvents mentioned above. In accordance with a preferred method, the dehydration of the polyamic acids is carried out in acetone, using acetic anhydride, as the anhydride, in an amount from 1.05 to 1.5 mol per molar amic acid group, in the presence of triethylamine, as the tertiary amine, in an amount of the order of 0.15 to 0.5 mol per molar amic acid group and of nickel acetate as the nickel catalyst, in an amount from 0.5 to 5 millimols per molar amic acid group.

Amongst these oligomers possessing imide groups of formula (1), those in which at least 80% of the T radicals contain a polymerisable carbon-carbon double bond are preferably used. Also for preference, the oligomers are used in amounts such that they supply 1.2 to 5 T radicals possessing such a double bond per $-NH_2$ group supplied by the polyamine.

The preparation of the polymer compositions according to the invention can advantageously be carried out in two stages. In a first stage, a prepolymer (P) with a softening point below 250° C. can be prepared by heating the polyamine and the oligomer possessing imide groups at between 50° C. and 250° C.; the prepolymer can be shaped in the form of solution, suspension, a powder or a liquid mass. The prepolymers which are particularly envisaged are those with a softening point situated between 100° C. and 200° C.; they can be obtained by heating the polyamine and the oligomer possessing imide groups, in bulk, until a homogeneous liquid or paste-like mixture is obtained. The temperature can vary as a function of the melting point of the starting reagents, but, as a general rule, it is situated between 80° C. and 200° C. It is advantageous to carry out a prior homogenisation of the mixture of the reagents.

The prepolymers can also be prepared by heating the reagents in a polar solvent such as dimethylformamide, N-methylpyrrolidone, dimethylacetamide, N-methylcaprolactam, diethylformamide or N-acetylpyrrolidone, at a temperature which is generally between 50° C. and 180° C. For numerous uses, the prepolymer solutions can be used as they are; the prepolymer can also be isolated from its solution by precipitation with a diluent which is miscible with the polar solvent and which does not dissolve the prepolymer; water or a hydrocarbon with a boiling point which is not substantially above 120° C. can advantageously be used as the diluent.

The prepolymers can be used in the form of a liquid mass, simple hot-casting being sufficient to shape them. After cooling and grinding, it is also possible to use them in the form of powders which are remarkably suitable for compression-moulding operations, optionally in the presence of fillers in the form of powders, spheres, granules, fibres or flakes. In the form of suspensions or solutions, the prepolymers can be used to produce coatings and pre-impregnated intermediate articles, the reinforcement of which can consist of fibrous materials based on, for example, aluminium or zirconium silicate or aluminium or zirconium oxide, carbon, graphite, boron, asbestos or glass.

In a second stage, the prepolymers can be cured by heating up to temperatures of the order of 350° C., generally between 150° and 300° C. A supplementary shaping can be carried out during the curing, optionally in vacuo or at a pressure above atmospheric pressure; it is also possible for these operations to be carried out consecutively. The curing can be carried out in the presence of a radical polymerisation initiator such as lauroyl peroxide, cumyl peroxide or azo-bis-isobutyronitrile, or of an anionic polymerisation catalyst such as diazabicyclooctane.

The mechanical properties of the polymer compositions liable to be subjected to heat for a long period can generally be improved by incorporating an aromatic tricarboxylic or tetracarboxylic acid anhydride. These latter can be monoanhydrides such as those of the general formula:

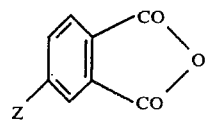
(X)

in which the symbol Z can represent a group such as

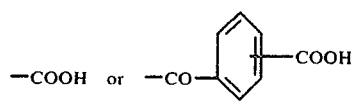

Amongst these monoanhydrides, there may be mentioned, more particularly, trimellitic anhydride and benzophenone-3,4,4'-tricarboxylic acid anhydride. They can also be dianhydrides such as pyromellitic anhydride or a dianhydride of the general formula:

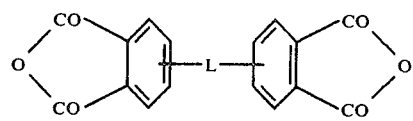
(XI)

in which L can represent a divalent radical such as —N=N—,

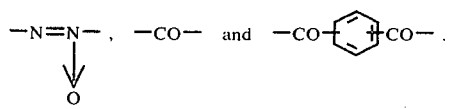

Amongst the latter dianhydrides, there may be mentioned, more particularly, azophthalic anhydride and the dianhydrides of m- or p-bis-(3,4-dicarboxy-benzoyl)-benzene acids. The anhydride is advantageously incorporated in the prepolymer (P) in an amount of the order of 1 to 5% by weight, relative to the weight of the prepolymer.

The polymers according to the invention can also contain, by way of an adjuvant, an aromatic compound (AR) possessing 2 to 4 benzene rings, which does not sublime at atmospheric pressure up to 250° C. and which has a boiling point above 250° C. In these aromatic compounds, the benzene rings can form condensed nuclei or they can be bonded to one another by a valency bond or by an inert atom or group such as —O—, —CO—, —CH$_2$—,

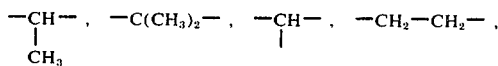

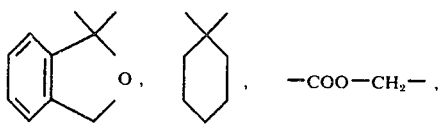

—COO—, —CO—NH—, —S—, —SO$_2$—, —NH—, —N(CH$_3$)—,

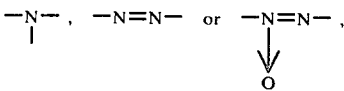

it being understood that in any one compound more than one type of linkage and ring is possible. The benzene rings can be substituted by inert radicals such as —CH$_3$, —OCH$_3$, —F, —Cl and —NO$_2$. Typical examples include terphenyl isomers, chlorinated diphenyl, phenyl ether, 2,2'-naphthyl ether, o-methoxyphenyl ether, benzophenone, p-phenylbenzophenone, p-fluorobenzophenone, diphenylamine, diphenylmethylamine, triphenylamine, azobenzene, 4,4'-dimethylazobenzene, azoxybenzene, diphenylmethane, 1,1-diphenyl-ethane, 1,1'-diphenyl-propane, triphenylmethane, diphenylsulphone, phenyl sulphide, 1,2-diphenylethane, p-diphenoxybenzene, 1,1-diphenyl-phthalane, 1,1-diphenyl-cyclohexane, phenyl benzoate, benzyl benzoate, p-nitrophenyl terephthalate and benzanilide. These aromatic adjuvants can be used in amounts up to about 10% by weight, relative to the weight of the prepolymer (P) (or to the weight of the mixture of reagents). The adjuvant (AR) is preferably added to the prepolymer (P) or it can be introduced into the mixture at any time during the preparation of the latter.

The addition of these aromatic compounds gives rise to objects which, after curing, are even more resistant to heat stresses over a long period; this is particularly noticeable in the case of parts which are compression-moulded. These adjuvants are also of value in producing a prepolymer composition intended to be shaped in the liquid state, because they make it possible to extend the period during which the prepolymer can be used in the molten state; furthermore, they generally have the effect of lowering the softening point of the prepolymers.

The polymers of this invention can also be modified by the addition, before curing, of a monomer (M) containing at least one polymerisable $CH_2=C<$ group which can be of the vinyl, allyl and acrylic type. The monomers can possess several $CH_2=C<$ groups subject to the condition that the double bonds are not conjugated. In any one monomer, these groups can be of one and the same type or they can be different, Further a single monomer or a mixture of copolymerisable monomers can be used. The monomers which can be used can be esters, ethers, hydrocarbons, substituted heterocyclic derivatives or organometallic or organometalloid compounds.

Suitable esters include allyl, methallyl, 1-chloro-allyl, crotyl, isopropenyl and cinnamyl esters, which are derived from saturated or unsaturated aliphatic or aromatic monocarboxylic or polycarboxylic acids such as acetic, propionic, butyric, oxalic, malonic, succinic, adipic, sebacic, acrylic, methacrylic, phenylacrylic, crotonic, maleic, fumaric, itaconic, citraconic, tetrahydrophthalic, acetylene-dicarboxylic, benzoic, phenylacetic, orthophthalic, terephthalic, isophthalic, trimellitic and trimesic acids, as well as the esters of non-polymerisable alcohols such as benzyl, isopropyl and 2-ethyl-hexyl esters, which are derived from polymerisable acids such as those mentioned above. Typical specific examples of esters include allyl acetate, methyl acrylate, methyl methacrylate, vinyl methacrylate, allyl maleate, allyl fumarate, allyl phthalate, allyl malonate, triallyl trimellitate and allyl trimesate.

Suitable ethers which can be used include vinyl allyl ether, allyl ether, methallyl ether and allyl crotyl ether.

Suitable substituted heterocyclic compounds include the vinylpyridines, N-vinyl-pyrrolidone, N-vinylcarbazole, allyl cyanurate, allyl isocyanurate, vinyl-tetrahydrofurane, vinyldibenzofurane, allyloxytetrahydrofurane and N-allylcaprolactam. Hydrocarbons such as styrene, alpha-methylstyrene, p-chloro-styrene, diallylbenzene and vinyltoluene can be used.

Amongst the monomeric organometallic and organometalloid derivatives, there may be mentioned especially those which contain one or more atoms of phosphorus, boron or silicon, such as silanes or siloxanes, phosphines, phosphine oxides or phosphine sulphides, phosphates, phosphites, phosphonates, boranes, orthoborates, boronates, boroxoles, borazoles and phosphazenes. Typical examples include 1,3-diallyltetramethyldisiloxane, phenylallyldimethylsilane, allyldimethylphosphine oxide, allyl orthophosphate, allyl methylphosphonate, triallylborazole, triallyboroxole, triallyltrichlorophosphazene, allyl phosphate and allyl allylphosphonate.

Furthermore, these various monomers can contain halogen atoms, principally chlorine or fluorine atoms, or functional groups such as an alcoholic or phenolic hydroxyl group, an aldehyde carbonyl group, or an amido, epoxy or nitrile group. Examples of monomers (M) possessing such substituents include allyloxyethanol, p-allyloxyphenol, tetraallylepoxyethane, glycidyl acrylate, glycidyl methacrylate, allyl glycidyl ether, p-cyanostyrene, acrylamide, N-methylacrylamide, N-allylacrylamide, N-methylolacrylamide, methyl allyl ketone, acrylonitrile, methyl-acrylonitrile, p-chlorostyrene, p-fluorostyrene and β-hydroxy-ethyl diallyl cyanurate.

The monomer (M) can be added to the prepolymer (P) or it can be introduced into the mixture at any time during the latter's preparation. The amount used is chosen so that it represents less than 50%, and preferably 5 to 40%, by weight of the weight of the prepolymer (P) or of the weight of the mixture of reagents. The curing of the prepolymer modified by the monomer (M) can be carried out under the same conditions as for the unmodified prepolymer.

The polymers according to the invention can also be modified by the addition, before curing, of an unsaturated polyester. The unsaturated polyesters which can be used are well known products. They are usually prepared by the polycondensation of polycarboxylic derivatives and polyols including esters of lower alcohols, acid chlorides and, sometimes, anhydrides. At least one of the monomers subjected to the polycondensation contains olefinic unsaturation. Unsaturated polyesters derived from diacids or dianhydrides with an olefinic double bond in the αβ-position are generally employed. By way of example, the polycarboxylic derivatives can be of the maleic, chloromaleic, itaconic, citraconic, aconitic, pyrocinchonic, fumaric, chlorendic, endomethylene-tetrahydrophthalic, tetrahydrophthalic, ethylmaleic, succinic, sebacic, phthalic, isophthalic, tetrahydrophthalic, adipic and hexahydrophthalic type. Typical polyols which can be used include ethylene glycol, propylene glycol, diethylene glycol, triethylene glycol, neopentyl glycol, tetraethylene glycol, butylene glycol, dipropylene glycol, glycerol, trimethylolpropane, pentaerythritol, sorbitol and 3,3-bis-(hydroxymethyl)-cyclohexene.

The term "unsaturated polyester", as used herein, also includes solutions of the polycondensates described above in a monomer (M') which is capable of copolymerising with them. These monomers are also well known in polyester technology; such monomers include styrene, alpha-methylstyrene, vinyltoluene, p-(alphamethylvinyl)-benzophenone, divinylbenzene, vinyl 2-chloroethyl ether, N-vinyl-pyrrolidone, 2-vinylpyridine, indene, methyl acrylate, methyl methacrylate, acrylamide, N-t-butylacrylamide, acrylonitrile, 1,3,5-hexahydrotriacrylo-s-triazine, allyl phthalate, allyl fumarate, allyl cyanurate, allyl phosphate, diethylene glycol diallyl-carbonate, allyl lactate, allyl malonate, allyl tricarballylate, allyl trimesate and allyl trimellate. When it is used, the monomer (M') generally represents from 10% to 60% of the weight of the solution of unsaturated polyester.

The preparation of the unsaturated polyesters can be carried out in known manner; on this subject, reference can, for example, be made to the work of Encyclopedia of Chemical Technology, KIRK-OTHMER, 2nd edition, volume 20.

The details regarding the introduction and the amounts of unsaturated polyester as well as to the curing to form resins are identical to those mentioned above in connection with the addition of a monomer (M).

The incorporation of a monomer (M) or of an unsaturated polyester leads to curable mixtures which can be used, in particular, as impregnating resins; after the addition of fillers, they can be used as coating materials.

The polymers of this invention form excellent curing agents for epoxy resins; for this use, it is advantageous to use a polymer which has a softening point below 250° C. and a prepolymer (P) is preferably used as the curing agent. All the usual epoxy resins can be used in this way. Amongst the latter, there may be mentioned, for example, glycidyl ethers obtained by reacting, in known manner, polyols such as glycerol, trimethylolpropane, butanediol or pentaerythritol with epichlorohydrin. Other suitable epoxy resins are glycidyl ethers of phenols such as 2,2-bis-(4-hydroxyphenyl)-propane, bis-(hydroxy-phenyl)-methane, resorcinol, hydroquinone, pyrocatechol, phloroglucinol, 4,4'-dihydroxydiphenyl and condensation products of the phenol-/aldehyde type. It is also possible to use the products of the reaction of epichlorohydrin with primary or secondary amines such as bis-(4-methyl-amino-phenyl)-methane or bis-(4-amino-phenyl)-sulphone as well as aliphatic or alicyclic polyepoxides originating from the epoxidation, by means of peracids, of the corresponding unsaturated derivatives. These various types of epoxy resins are now well described in the literature and, insofar as their preparation is concerned, reference can, for example, be made to Houben-Weil, volume 14/2, page 462. The epoxy resins in which each molecule possesses at least 2 and preferably more than 3 epoxy groups are very particularly valuable, especially essentially aromatic resins such as the glycidyl ethers of poly-(hydroxyphenyl)-alkanes or of phenol-formaldehyde resins.

The amount of prepolymer used can vary within wide limits; it is usually chosen so that the weight of prepolymer represents 20% to 80% of the weight of the entire mixture (epoxy resin + prepolymer). The mixtures of epoxy resin and prepolymer can be cured at temperatures of 150° C. to 300° C. In practice, according to one procedure, the epoxy resin and the prepolymer (P) are intimately mixed. Depending on the physical characteristics of the ingredients, this operation can involve applying the usual techniques for mixing finely divided solids, or of dissolving or suspending one of the constituents of the mixture in the other which is kept in the liquid state, optionally in a solvent, such as one of those mentioned above for the preparation of the prepolymer, or in acetone, ethyl acetate, methylene chloride or methanol. The mixture of the resin and the prepolymer is then heated to a temperature of the order of 50° C. to 200° C. until a homogeneous liquid or paste-like mixture is obtained, which can be used as it is; it can, for example, be shaped by simple casting while hot, and then subsequently cured under the conditions mentioned above. It is also possible to use this mixture, after cooling and grinding, in powdered form; this is particularly suitable for compression-moulding, optionally combined with fibrous or pulverulent fillers. This mixture can also be used in solution for the preparation of laminated materials, the base of which can be formed from mineral, vegetable or synthetic fibres.

According to an embodiment which is particularly advantageous in the case of shaping by casting, the prepolymer can be prepared within the epoxy resin itself by heating the mixture of the epoxy resin with the imide of formula (I) and the polyamine of formula (IV); a variant of this method involves liquefying the mixture of epoxy resin and imide of formula (I) by heating and then adding the polyamine of formula (IV) to this liquid mixture.

The polymers of this invention are of value in industrial applications which require materials which possess good mechanical and electrical properties as well as great chemical inertness at temperatures of the order of 200° C. to 300° C. By way of example, they are suitable for the manufacture of plate or tubular insulators for electrical transformers, printed circuits, and self-lubricating pinions, bushes and catches.

The following Examples further illustrate the present invention.

EXAMPLE 1

A mixture consisting of 100 g. of an imide of the average formula:

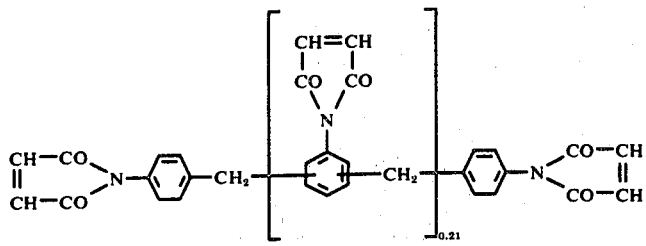

22 g. of a polyamine of the average formula:

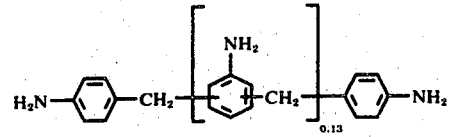

and 81.5 g. of dimethylformamide is heated at 105° C. for 1 hour. The solution obtained is cooled and then poured into 500 cm³ of water which is stirred vigorously. The prepolymer which has precipitated is filtered off and then washed three times, each time using 500 cm³ of water heated to 50° C. The prepolymer is finally dried at 50° C. under 3 mm. of mercury.

22.5 g. of prepolymer are dissolved in 27.5 g. of N-methylpyrrolidone. 13.5 dm² of satin-type glass fibre fabric, with a specific weight of 308 g/m² and which has been pre-treated with γ-aminopropyltriethoxy-silane, are coated with the solution obtained. After coating, the fabric is kept for 1 hour in a chamber heated to 110° C. After cooling, the coated fabric is cut up into rectangular pieces (9 × 10 cm.) which are stacked in such a way as to form a laminated assembly. This assembly is then pressed under 30 bars between the platens of a press which has been preheated to 150° C.; then the temperature is increased over a period of 1 hour to 250° C. During cooling, the laminate is released when the temperature drops to 150° C. It is then subjected to an additional heat treatment at 250° C. for 24 hours; the laminate obtained then has a flexural breaking strength of 25 kg/mm² at 250° C.

The imide used in this Example is prepared in the following manner. 205.8 g. of maleic anhydride are dissolved in one liter of acetone, and then a solution prepared from 202.2 g. of a polyamine of average formula:

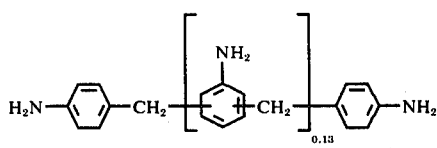

in 500 cm³ of acetone is added over a period of 30 minutes, with stirring. The mixture is heated to 56° C. and maintained at this temperature for 30 minutes. 51.7 g. of triethylamine, 2 g. of nickel acetate tetrahydrate and 255 g. of acetic anhydride are then added.

The mixture is heated at the boil (56° C.); after 30 minutes, a clear solution is obtained which is maintained thus for 1 hour, and then it is cooled to 8° C. 3.5 l. of water are added to the cooled solution over a period of 1 hour 30 minutes, and then the viscous organic mass which separates out is isolated; 1.5 kg. of iced water are added to it and the solid which precipitates is filtered off. This solid is washed three times, using 1.5 kg. of iced water each time. After drying at 45° C. under 5 mm. of mercury, 350 g. of the imide, the softening point of which is of the order of 90° C., are obtained.

EXAMPLE 2

The mixture of imide, polyamine and dimethylformamide described in Example 1 is heated at 105° C. for 3 hours and then poured into 800 cm³ of water with vigorous stirring. The prepolymer is then treated as described in Example 1, finely ground, and then heated at 120° C. for 2 hours.

25 g. of the powder thus obtained are introduced into a cylindrical mould (diameter: 75 mm.), and then the mould is placed between the platens of a press previously heated to 250° C. The whole is then kept at this temperature for 1 hour under a pressure of 200 bars. After it has been removed from the mould when hot, the object is subjected to an additional heat treatment at 250° C. for 24 hours; it then has a flexural breaking strength of 7.5 kg/mm² at 250° C.

EXAMPLE 3

22.5 g. of an imide of the average formula:

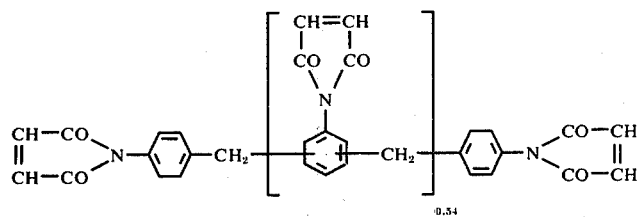

5.10 g. of a polyamine of the average formula:

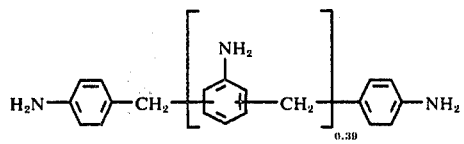

and 3.08 g. of allyl phthalate are intimately mixed and then the mixture is heated at 160° C. for 14 minutes. After cooling and grinding, a prepolymer is obtained, the softening point of which is 134° C. It is again heated for 2 hours at 120° C. and then moulded under the conditions described in Example 2. The object then has a flexural breaking strength of 8.75 kg/mm² at 250° C.

The imide used in this example is prepared as follows. A solution prepared from 204 g. of a polyamine of the average formula:

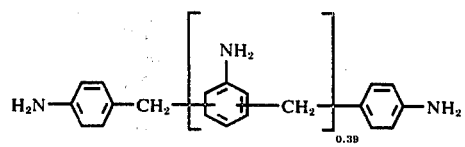

and 600 cm³ of acetone added, over a period of 30 minutes and with stirring, to a solution of 205.8 g. of maleic anhydride in 900 cm³ of acetone.

The mixture is heated at 56° C. for 30 minutes and then 51.7 g. of triethylamine, 2 g. of nickel acetate tetrahydrate and 255 g. of acetic anhydride are added to it. This mixture is then treated as stated in Example 1; 340 g. of the imide, the softening point of which is of the order of 90° C., are finally isolated.

EXAMPLE 4

The procedure described in Example 3 is followed, but the allyl phthalate is replaced by the same weight of triallyl trimellitate. The prepolymer has a softening point of 135° C. The moulded object has a flexural breaking strength of 8 kg/mm² at 250° C.

EXAMPLE 5

23.32 g. of an imide of the average formula:

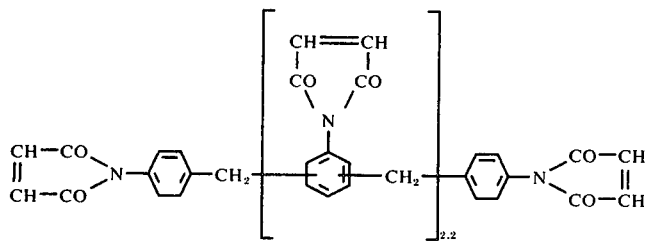

and 5.10 g. of a polyamine of the average formula:

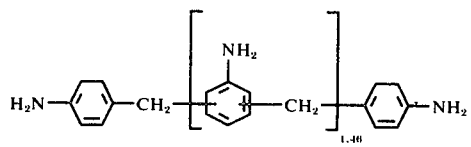

are intimately mixed and then the mixture is heated at 160° C. for 11 minutes. After cooling and grinding, the prepolymer has a softening point of 156° C. It is heated at 120° C. for 1 hour and then moulded under the conditions described in Example 2. The moulded object has a flexural breaking strength of 8.1 kg/mm² at 250° C.

The imide used in this Example is prepared in the following manner. 102.9 g. of maleic anhydride are dissolved in 300 cm³ of acetone and 106.5 g. of a polyamine of the average formula:

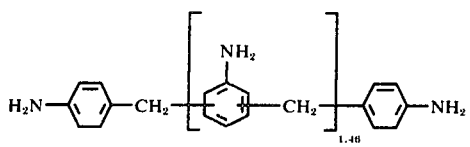

dissolved in 350 cm³ of acetone are then added over a period of 40 minutes. The mixture is brought to the boil for 30 minutes and then 5 g. of nickel acetate tetrahydrate, 30.3 g. of triethylamine and 127.5 g. of acetic anhydride are added to it. Heating is continued for 2 hours 30 minutes and then the mixture is cooled to 8° C. 2 kg. of iced water are then added and the mixture is then stirred vigorously. A precipitate forms which is filtered off and then washed three times, using 3 kg. of iced water each time; the precipitate is finally dried at 60° C. under 3 mm. of mercury; 172 g. of the imide, the softening point of which is about 126° C., are obtained.

EXAMPLE 6

An intimate mixture prepared from 45.2 g. of the imide, the preparation of which is described in Example 1, and 10.2 g. of bis-(4-amino-phenyl) ether is heated at 160° C. for 43 minutes. After cooling and grinding, a prepolymer powder; the softening point of which is 145° C., is obtained.

25 g. of this powder are introduced into a cylindrical mould (diameter: 7.6 cm.) which is placed between the platens of a press heated to 250° C. Moulding is carried out under 250 bars at 250° C. for 1 hour. After removal from the mould when hot, the object is subjected to an additional heat treatment at 250° C. for 72 hours. It then has a flexural breaking strength of 6.5 kg/mm² at 250° C.; at 25° C., this strength is 9.4 kg/mm².

EXAMPLE 7

71.4 g. of an imide of the average formula:

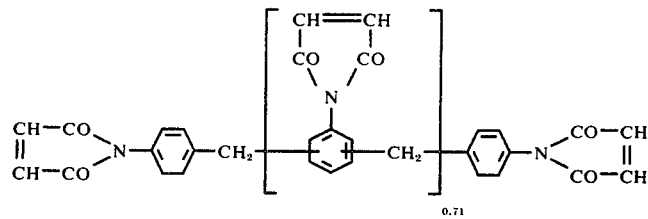

15.5 g. of bis-(4-amino-phenyl)-methane, 10 g. of 1,3-diphenyl-benzene and 3 g. of trimellitic anhydride are intimately mixed and then heated at 150° C. for 1 hour 30 minutes. After cooling and grinding, the prepolymer has a softening point of 154° C.

25 g. of the powder thus obtained are introduced into a cylindrical mould (diameter: 75 mm.) and then the mould is placed between the platens of a press which has previously been heated to 250° C. The whole is then kept at this temperature for 1 hour under a pressure of 200 bars. After removal from the mould when hot, the object is subjected to an additional heat treatment at 250° C. for 24 hours. It then has a flexural breaking strength of 12.8 kg/mm² at 25° C. After a heat test lasting 500 hours at 250° C., this strength is still 9.5 kg/mm².

The imide used in this Example was prepared in the manner indicated for the preparation of the imide used in Example 1, but employing 204 g. of a polyamine of the average formula:

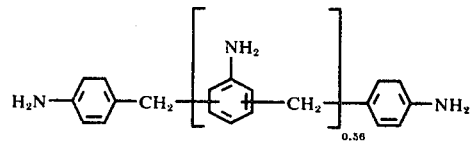

EXAMPLE 8

26.6 g. of an epoxy resin which can be represented by the average formula:

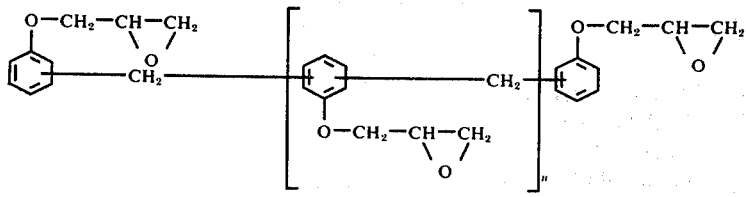
(I)

containing, on average, 0.556 epoxy group per 100 g. of product and sold under the tradename "Epikote 154", 40 g. of an oligomer with the average formula:

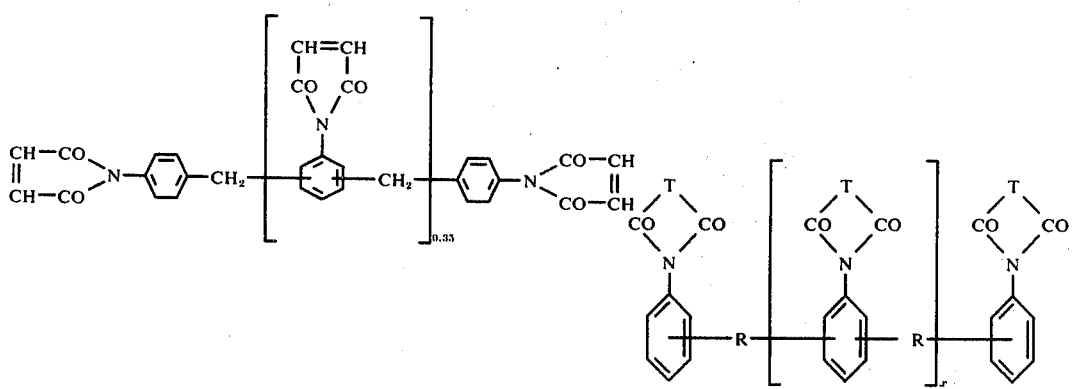

and 5.3 g. of 1,3-diphenyl-benzene are introduced into a container surrounded by a fluid heated to 110° C. When the mixture begins to melt, it is stirred and maintained under these conditions for 10 minutes. 7.5 g. of bis(4-amino-phenyl)-methane are then added and the mixture is stirred for a further 2 minutes.

The liquid mixture is then cast in a parallelepiped mould (125 × 75 × 6 mm.), the internal walls of which have a polytetrafluoroethylene coating, previously heated to 200° C. The whole is left for 24 hours at this temperature and is then removed from the mould when hot. The moulded object is subjected to an additional heat treatment for 24 hours at 250° C. It then has a flexural breaking strength of 9.9 kg/mm² at 25° C. After a heat test lasting 560 hours at 250° C., this strength is 11.4 kg/mm².

The imide used in this Example was prepared in the manner indicated for the preparations of the imide used in Example 1, but employing 202 g. of a polyamine of the average formula:

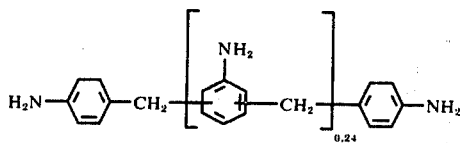

I claim:

1. A process for curing a 1,2-epoxy resin which comprises mixing the epoxy resin with a curing amount of a prepolymer composition, said composition being prepared by heating (a) an oligomer having the average general formula:

in which x represents a number from 0.1 to about 2, R represents a divalent hydrocarbon radical with 1 to 8 carbon atoms, which is derived from an aldehyde or a ketone of the general formula:

$$O = R \quad (II)$$

in which the oxygen atom is bonded to a carbon atom of the radical R, and T represents a divalent organic radical possessing 2 to 24 carbon atoms, the free valencies of which are on adjacent carbon atoms and which is derived from an internal anhydride of the general formula:

(III)

at least 60% of the T radicals in the oligomer containing a polymerisable carbon-carbon double bond, the remaining T radicals, if any, being alkylene, cycloalkylene, phenylene or naphthylene radicals with (b) a polyamine of the general formula:

$$Q(NH_2)_y$$

in which y represents an integer at least equal to 2 and Q represents:

a divalent organic radical E selected from the group consisting of a linear or branched alkylene radical with less than 13 carbon atoms, a phenylene radical, a cyclohexylene radical, a phenylene radical substituted by a methyl radical, a cyclohexylene radical substituted by a methyl radical, radicals of the formulae:

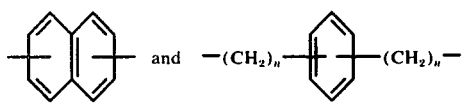

wherein n represents an integer from 1 to 3, a radical consisting of a plurality of phenylene, cyclohexylene, phenylene substituted by methyl or cyclohexylene substituted by methyl, radicals connected to one another by a simple valency bond or by —O— or —S—, an alkylene group with 1 to 3 carbon atoms, —CO—, —SO₂—, —CONH—, —COO—, —P(O)R₁—, —CONH—X—NHCO—,

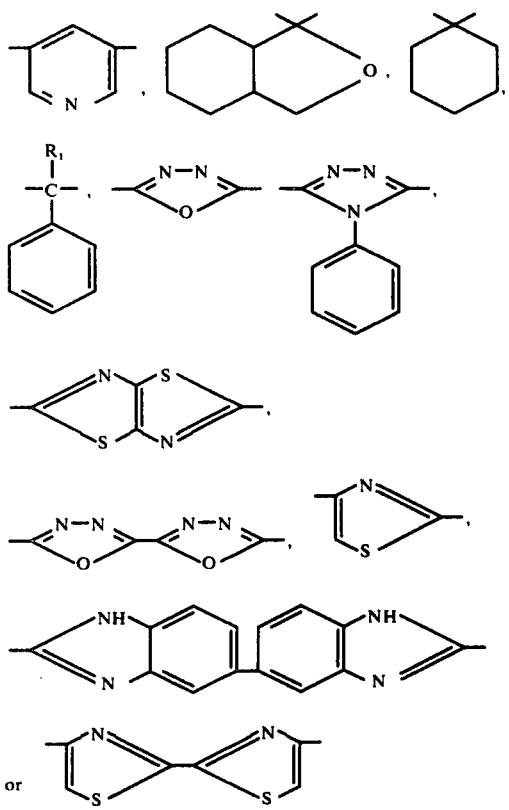

wherein R₁ represents a hydrogen atom, an alkyl radical with 1 to 4 carbon atoms, a phenyl radical or a cyclohexyl radical, and X represents an alkylene radical with less than 13 carbon atoms, and a 2- to 4-valent radical of the formula:

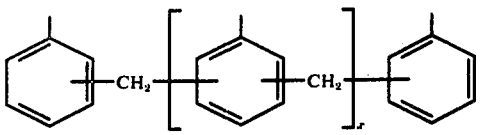

in which x represents a number from 0.1 to 2, the relative amounts being such that the oligomer supplies 1.1 to 50 T radicals containing a polymerisable carbon-carbon double bond per —NH₂ group supplied by the polyamine at a temperature from about 80° C. to about 200° C. until a homogeneous liquid or paste-like mixture is obtained, and the mixture of prepolymer and epoxy resin is then cured by subsequent heating at between 150° C. and 300° C.

2. A process according to claim 1 in which the oligomer supplies 1.2 to 5 T radicals possessing a polymerisable carbon-carbon double bond per —NH₂ group supplied by the polyamine.

3. A process according to claim 1 in which the polyamine is a diprimary diamine of the formula:

H₂N-E-NH₂ in which E is as defined in claim 1.

4. A process according to claim 1 in which the polyamine is a mixture of a diprimary diamine an an amine having an average of more than two amino groups per molecule, in an amount up to 90% by weight of the diamine.

5. A process according to claim 1 in which the polyamine consists of an oligomer of the average formula:

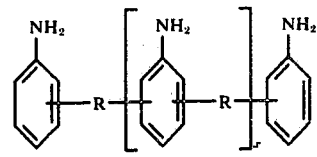

in which x and R are as defined in claim 1.

6. A process according to claim 1 in which R represents a CH₂ radical.

7. A process according to claim 1 in which at least 60% of the T radicals are —CH═CH— radicals.

8. A process according to claim 7 in which the remainder of the T radicals are

radicals.

9. A process according to claim 1 in which at least 80% of the T radicals contain a polymerisable carbon-carbon double bond.

10. A process according to claim 1 in which, before curing, an aromatic compound possessing 2 to 4 benzene rings, which does not sublime at atmospheric pressure up to 250° C. and which has a boiling point above 250° C. is incorporated in an amount up to about 10% by weight based on the weight of the prepolymer and epoxy resin.

11. A process according to claim 1 in which an aromatic tricarboxylic or tetracarboxylic acid anhydride is added to the prepolymer, before curing, in an amount from about 1 to 5% by weight of the prepolymer.

12. A process according to claim 1 in which a monomer containing at least one polymerisable CH₂═C< group of the vinyl, allyl or acrylic type is incorporated before curing in an amount up to 50% by weight based on the weight of the prepolymer and epoxy resin.

13. A process for curing a 1,2-epoxy resin which comprises mixing the epoxy resin with a curing amount of a prepolymer composition, said composition being prepared by heating (a) an oligomer having the average general formula:

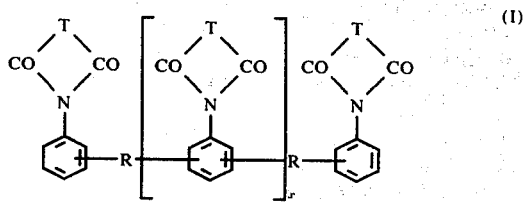
(I)

in which $x$ represents a number from 0.1 to about 2, R represents a divalent hydrocarbon radical with 1 to 8 carbon atoms, which is derived from an aldehyde or a ketone of the general formula:

$$O=R \qquad (II)$$

in which the oxygen atom is bonded to a carbon atom of the radical R, and T represents a divalent organic radical possessing 2 to 24 carbon atoms, the free valencies of which are on adjacent carbon atoms and which is derived from an internal anhydride of the general formula:

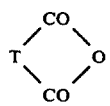
(III)

at least 60% of the T radicals in the oligomer containing a polymerisable carbon-carbon double bond, the remaining T radicals, if any, being alkylene, cycloalkylene, phenylene or naphthylene radicals, with (b) a polyamine of the general formula:

$$Q(NH_2)_y$$

in which $y$ represents an integer at least equal to 2 and Q represents:

a divalent organic radical E selected from the group consisting of a linear or branched alkylene radical with less than 13 carbon atoms, a phenylene radical, a cyclohexylene radical, a phenylene radical substituted by a methyl radical, a cyclohexylene radical substituted by a methyl radical, radicals of the formulae:

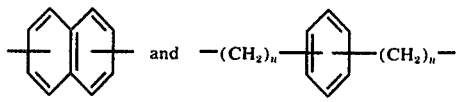

wherein $n$ represents an integer from 1 to 3, a radical consisting of a plurality of phenylene, cyclohexylene, phenylene substituted by methyl or cyclohexylene substituted by methyl; radicals connected to one another by a simple valency bond or by —O— or —S—, an alkylene group with 1 to 3 carbon atoms, —CO—, —SO$_2$—, —CONH—, —COO—, —P(O)R$_1$—, —CONH—X—NHCO—,

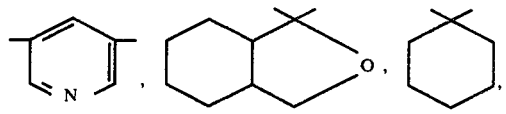

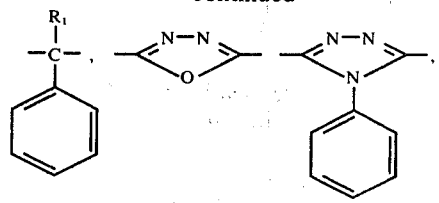

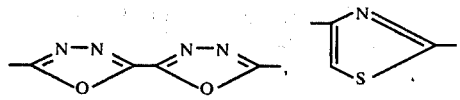

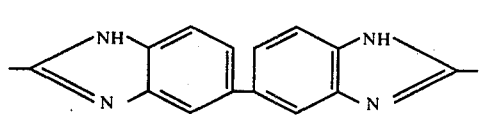

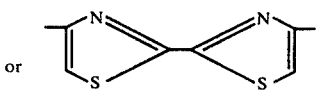

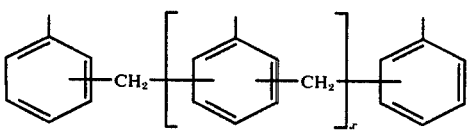

wherein R$_1$ represents a hydrogen atom, an alkyl radical with 1 to 4 carbon atoms, a phenyl radical or a cyclohexyl radical, and X represents an alkylene radical with less than 13 carbon atoms, and a 2- to 4-valent radical of the formula:

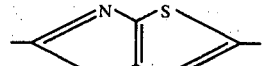

in which $x$ represents a number from 0.1 to 2, the relative amounts being such that the oligomer supplies 1.1 to 50 T radicals containing a polymerisable carbon-carbon double bond per —NH$_2$ group supplied by the polyamine, in an inert polar solvent at a temperature from about 50° C. to about 180° C., and the mixture of prepolymer and epoxy resin is then cured by subsequent heating at between 150° C. and 300° C.

14. A process according to claim 13 in which the oligomer supplies 1.2 to 5 T radicals possessing a polymerisable carbon-carbon double bond per —NH$_2$ group supplied by the polyamine.

15. A process according to claim 13 in which the polyamine is a diprimary diamine of the formula:

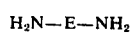

in which E is as defined in claim 13.

16. A process according to claim 13 in which the polyamine is a mixture of a diprimary diamine and an amine having an average of more than two amino groups per molecule, in an amount up to 90% by weight of the diamine.

17. A process according to claim 13 in which the polyamine consists of an oligomer of the average formula:

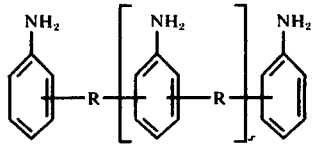

in which $x$ and R are as defined in claim 13.

18. A process according to claim 13 in which R represents a $CH_2$ radical.

19. A process according to claim 13 in which at least 60% of the T radicals are —CH=CH— radicals.

20. A process according to claim 19 in which the remainder of the T radicals are

radicals.

21. A process according to claim 13 in which at least 80% of the T radicals contain a polymerisable carbon-carbon double bond.

22. A process according to claim 13 in which, before curing, an aromatic compound possessing 2 to 4 benzene rings, which does not sublime at atmospheric pressure up to 250° C. and which has a boiling point above 250° C. is incorporated in an amount up to about 10% by weight based on the weight of the prepolymer and epoxy resin.

23. A process according to claim 13 in which an aromatic tricarboxylic or tetracarboxylic acid anhydride is added to the prepolymer, before curing, in an amount from about 1 to 5% by weight of the prepolymer.

24. A process according to claim 13 in which a monomer containing at least one polymerisable $CH_2=C<$ group of the vinyl, allyl or acrylic type is incorporated before curing in an amount up to 50% by weight based on the weight of the prepolymer and epoxy resin.

* * * * *